United States Patent
Khandekar et al.

(10) Patent No.: US 12,393,013 B2
(45) Date of Patent: Aug. 19, 2025

(54) DIRECT THERMAL INFRARED VISION VIA NANOPHOTONIC DETECTOR DESIGN

(71) Applicant: The Board of Trustees of the Leland Stanford Junior University, Stanford, CA (US)

(72) Inventors: Chinmay Khandekar, Sunnyvale, CA (US); Weiliang Jin, Sunnyvale, CA (US); Shanhui Fan, Stanford, CA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 210 days.

(21) Appl. No.: 17/945,754

(22) Filed: Sep. 15, 2022

(65) Prior Publication Data
US 2024/0369821 A1    Nov. 7, 2024

Related U.S. Application Data
(60) Provisional application No. 63/244,584, filed on Sep. 15, 2021.

(51) Int. Cl.
*G02B 23/12* (2006.01)
*G02B 17/00* (2006.01)

(52) U.S. Cl.
CPC .......... *G02B 23/12* (2013.01); *G02B 17/002* (2013.01); *G02B 17/004* (2013.01); *G02B 2207/101* (2013.01)

(58) Field of Classification Search
CPC .... G02B 23/12; G02B 17/002; G02B 17/004; G02B 2207/101

USPC .......................................................... 359/350
See application file for complete search history.

(56) References Cited

U.S. PATENT DOCUMENTS

| | | | | |
|---|---|---|---|---|
| 8,309,899 | B1 * | 11/2012 | Deliwala | G03B 42/00 |
| | | | | 250/330 |
| 10,698,086 | B1 * | 6/2020 | Zhu | G02B 27/0172 |
| 2009/0060409 | A1 * | 3/2009 | Karras | G02F 1/0118 |
| | | | | 385/2 |

(Continued)

FOREIGN PATENT DOCUMENTS

| | | | |
|---|---|---|---|
| CN | 1940713 A | * | 4/2007 |
| JP | 2021155255 A | * | 10/2021 |

OTHER PUBLICATIONS

Choi et al., "Design and control of a thermal stabilizing system for a MEMS optomechanical uncooled infrared imaging camera", 2003, Sensors and Actuators A 104 132-142.

(Continued)

*Primary Examiner* — Stephone B Allen
*Assistant Examiner* — Boutsikaris Leonidas
(74) *Attorney, Agent, or Firm* — LUMEN PATENT FIRM (57) ABSTRACT

An infrared camera is provided having an uncooled focal plane array with pixels that are read out with visible light instead of electrically. Accordingly, the pixels of the focal plane array are configured to have a visible light reflectivity (at a specific operating wavelength) that is a sensitive function of pixel temperature. One way of providing visible light to such a focal plane array is with a side-illuminated diffractive optical waveguide structure. One way of providing high temperature sensitivity of the pixels is for the pixels to include resonant waveguide grating structures.

13 Claims, 7 Drawing Sheets

(56) References Cited

U.S. PATENT DOCUMENTS

| | | | | |
|---|---|---|---|---|
| 2010/0187419 A1* | 7/2010 | Hu | ............................ | G01J 5/02 |
| | | | | 29/592.1 |
| 2016/0069744 A1* | 3/2016 | Bayya | ................... | G01J 3/2823 |
| | | | | 250/339.01 |
| 2020/0025619 A1* | 1/2020 | Almasri | .................. | G01J 5/046 |

OTHER PUBLICATIONS

Khandekar et al. "Direct thermal infrared vision via nanophotonic detector design", Aug. 2021, arXiv:2108.11583v1.

Enemuo et al., "Thermo-optic sensor based on resonance waveguide grating for infrared/thermal imaging", 2015, IEEE Sensors Journal v15n8.

* cited by examiner

DIRECT THERMAL INFRARED VISION VIA NANOPHOTONIC DETECTOR DESIGN

CROSS REFERENCE TO RELATED APPLICATIONS

This application claims the benefit of U.S. provisional patent application 63/244,584, filed on Sep. 15, 2021, and hereby incorporated by reference in its entirety.

GOVERNMENT SPONSORSHIP

This invention was made with Government support under contract FA9550-21-1-0312 awarded by the Air Force Office of Scientific Research. The Government has certain rights in the invention.

FIELD OF THE INVENTION

This invention relates to infrared cameras.

BACKGROUND

Infrared cameras allow us to look at the world at infrared wavelengths, thereby transcending the visible-spectrum limitation of eyes. Traditional uncooled infrared cameras contain specifically designed infrared detectors whose output is converted to digital signals followed by image processing and a final projection of the infrared image on a separate display screen. However, this electronic image processing adds cost and complexity to the system. Accordingly, it would be an advance in the art to provide improved infrared cameras.

SUMMARY

We provide a nanophotonic design which eliminates the need for analog to digital conversion, image processing, and a separate display device. Because our design does not require these additional components, it advances the infrared camera technology by potentially reducing its size, form factor and cost. The underlying functionality developed by our design could enable minimalist small size eye-wearables/glasses that can augment human vision with thermal infrared vision.

In this architecture, the array of detector pixels is illuminated by visible laser light. The detectors are designed in such a way that the amount of reflection of the laser light depends on the temperature change in the pixel relative to the substrate induced by infrared radiation focused onto it. In other words, the infrared image of the far-field scene can be directly seen by looking at the detector array (also called as focal plane array) through a magnifying lens.

This approach can considerably simplify an uncooled infrared camera. Potential products based on this functionality can be a small-size eye-wearable that can allow direct thermal infrared vision to human eyes. Such a technological capability does not currently exist.

Similar to infrared cameras, it can have following applications requiring infrared images:

1. Detection and sensing in industrial (gas/chemical leakage), agricultural (crop qualities), infrastructure (building, bridge inspection), healthcare (thermograms)
2. Night-vision or low-light vision applications for military, fire-fighters, camping-enthusiasts.

Thermal infrared cameras already exist. However, they are usually bulky in nature and also costly. The functionality we provide can potentially reduce the cost, size as well as power consumption by getting rid of the system components (analog to digital conversion, image processing, separate display screen) which are essential in traditional infrared cameras. Very small thermal cameras have been developed. Our approach is an alternative solution which is based on a fundamentally different mechanism.

An exemplary embodiment is an apparatus including:
i) a focal plane array including two or more pixels;
ii) an input imager configured to receive infrared light from a scene being viewed and configured to provide an infrared image of the scene being viewed to the focal plane array. Here temperatures of the pixels of the focal plane array form a temperature image corresponding to the infrared image. The pixels of the focal plane array have a visible reflectance that depends on pixel temperature. Accordingly, the apparatus further includes:
iii) a source of visible light configured to illuminate the focal plane array with visible light; and
iv) an output imager configured to receive the visible light from the focal plane array and configured to provide a visible image to a user.

The output imager can be configured for direct viewing by the user, whereby no electronic processing of the infrared image is needed to make the infrared image visible.

The apparatus can further include a diffractive optical waveguide configured to be side-illuminated by the source of visible light, where diffraction in the diffractive optical waveguide directs the visible light from the source of visible light to the focal plane array, and where reflected visible light from the focal plane array passes through the diffractive optical waveguide to reach the output imager.

The pixels of the focal plane array can include one or more temperature sensitive optical structures such as: resonant waveguide gratings, photonic crystal resonators, whispering gallery resonators, and meta-atoms having Mie resonances.

The visible light can be at one or more wavelengths between 380 nm and 750 nm. The source of visible light can be a laser. The infrared light can be at one or more wavelengths between 8 µm and 14 µm.

Preferably, the pixels of the focal plane array are substantially thermally isolated from each other and from any other on-device heat sources which can lead to unwanted signals in IR detection.

The pixels of the focal plane array can include a material having a transmittance of 90% or more through a thickness of 10 mm in a wavelength range from 380 nm to 700 nm. The pixels of the focal plane array can include a material having a thermo-optic coefficient of $10^{-6}$ $K^{-1}$ or more. The pixels of the focal plane array preferably have IR absorptivity greater than or equal to 0.5. For example, materials like silicon carbide (SiC), boron nitride (BN), silicon dioxide or silica, silicon nitride all have strong absorption in the wavelength range of 8 to 10 µm, and hence are of interest for this work.

DETAILED DESCRIPTION

I. Introduction

Thermal infrared cameras provide images at infrared wavelengths, typically in the long-wave infrared (LWIR) range of 8 µm to 14 µm, thus allowing us to transcend the visible-spectrum limitation of human eyes. The infrared cameras include an imaging system and infrared detectors of which there are two types, namely photon detectors and thermal detectors. The former rely on the conversion of incident IR photons to electrons by using low-bandgap semiconductor detectors which typically require low cryogenic temperatures. The latter rely on the conversion of incident IR photons to heat using microbolometer detector pixels. The converted heat results into small temperature variations which can then be measured to form an image. Such thermal detectors can operate at or near room temperature. Based on operating temperatures, photon detectors and thermal detectors are also called as cooled and uncooled IR detectors respectively. The advantages of thermal detectors over photon detectors are lower cost, smaller size, lighter weight, lower maintenance, longer lifetime, immediate power-up capability and reduced power consumption, while the disadvantages are lower sensitivity and intrinsically slower response speed (typical time constant of few ms). Despite some of these disadvantages, the thermal detectors and cameras are used for an increasing number of cost-sensitive applications that do not necessarily demand high performance and speeds of photon detectors. Microbolometers are now produced in larger volumes than all other IR detector array technologies together.

In this work, we introduce a new nanophotonic detector in place of microbolometer to considerably simplify the overall architecture of the thermal IR imaging system, where 'thermal' indicates the underlying thermal detector as well as our focus on the detection of LWIR radiation generated thermally in the far-field. Our design is schematically illustrated in the left panel of FIG. 1A along with the schematic design of the standard thermal IR imaging system in the right panel (with dimensions not to scale). In both cases, LWIR radiation 102 from the far field is focused by an infrared-transparent lens 104 onto the focal plane array (FPA) (106 or 120) which includes micron-size detector pixels suspended on top of a substrate and designed to be good LWIR absorbers. In the standard design based on bolometers, such a pixel contains a phase change material (e.g. vanadium oxide) having temperature-sensitive electrical resistivity. A bias current is passed through the pixel and the voltage difference across it is measured using a readout integrated circuit (ROIC). The IR-absorption-induced temperature change of the bolometer causes its resistivity to change (typically few %/K). The resulting voltage change signals measured by ROIC are fed to A/D converters and after additional digital processing, final IR image is presented on a separate information display screen.

More specifically, in architecture 140 the IR light 102 from the far field is focused onto the array of detector pixels (also referred to as FPA (focal plane array) 120) by an IR imager 104. FPA 120 is suspended above a substrate (not shown). The absorption of IR photons causes heating of these suspended detector pixels. In the standard design 140, FPA 120 is a bolometer array whose pixel elements have a resistivity that changes sensitively with its temperature variation relative to the substrate. The resistivity change is measured using an electronic readout circuit (ROIC) 122. After additional A/D conversion and image processing, the final IR image is presented on a separate display screen. These three electronic processing steps are shown as 124 on FIG. 1A.

Figure 1A:
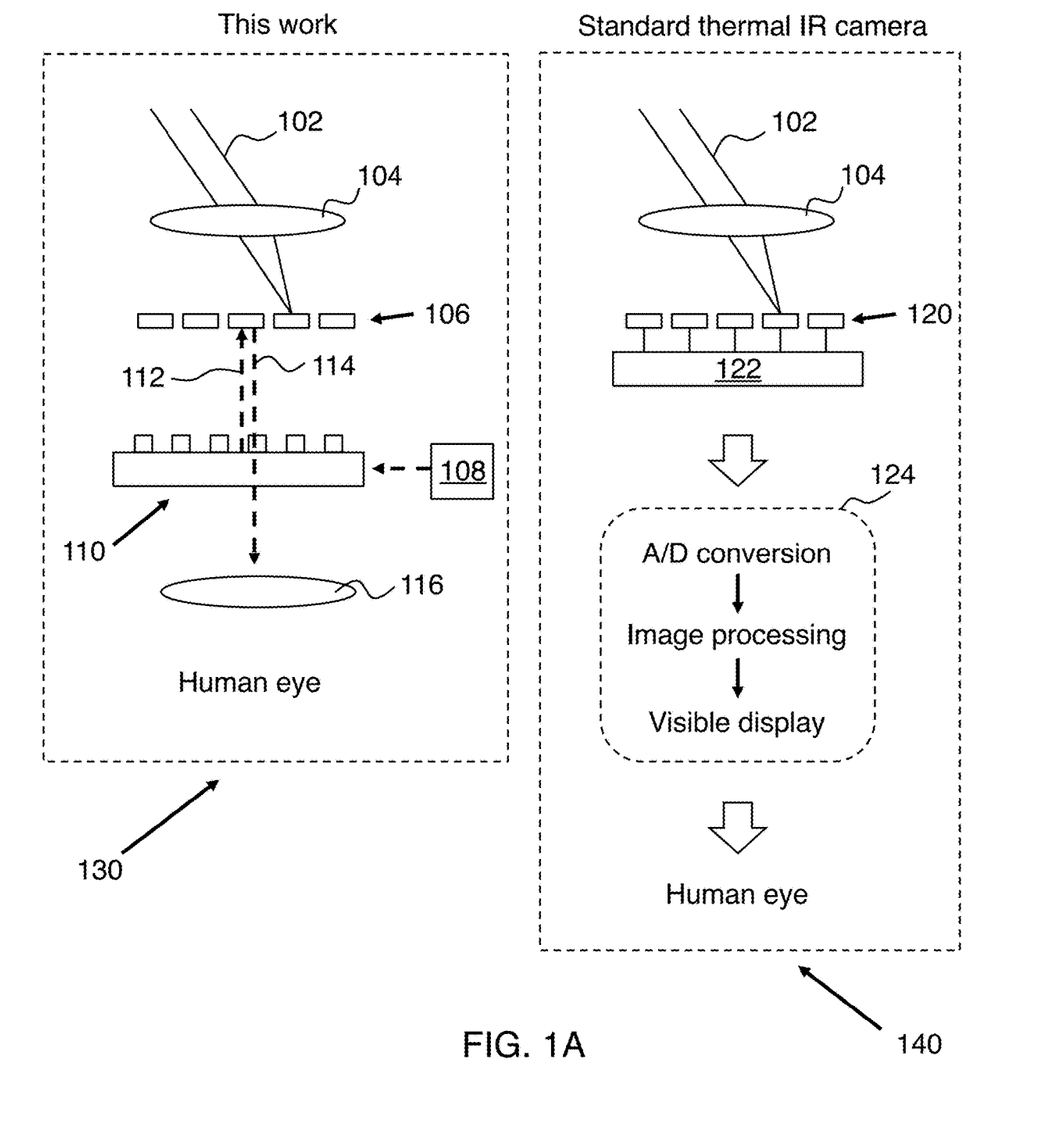
FIG. 1A is a schematic comparison of the approach of this work to conventional uncooled IR cameras.

We demonstrate a new design 130 where the final IR image can be directly visualized via reflection of visible laser light illuminating the FPA. In architecture 130 the IR light 102 from the far field is focused onto FPA 106 by an IR imager 104. FPA 106 is suspended above a substrate (not shown here, but shown on later figures). The absorption of IR photons causes heating of these suspended detector pixels. The FPA pixels are designed in such a way that their visible reflectivity changes from low to high in response to IR-absorption-induced heating. Upon illumination by visible light 112, reflected light 114 is modulated by these per-pixel reflectivity changes. As a result, imaging reflected light 114 with a visible imager 116 can permit direct user viewing of a visible image corresponding to the input IR image. Suitable visible imagers 116 are known on the art, and can be as simple as a lens. The source of visible light 112 can be an optical source 108, e.g., a laser configured to side-illuminate diffractive optical waveguide 110 such that visible light 112 is the resulting diffracted light.

Our design is motivated by the idea of directly visualizing the pixel temperature changes relative to the substrate by measuring the reflection of visible light. This will eliminate the need for A/D conversion, image processing, and a separate display screen. In this architecture, visible light is preferably projected onto the array of detector pixels using a diffractive optical waveguide 110 which is used in augmented reality eye-wearables that overlay digital content on top of the real-world scene.

Figure 1B:
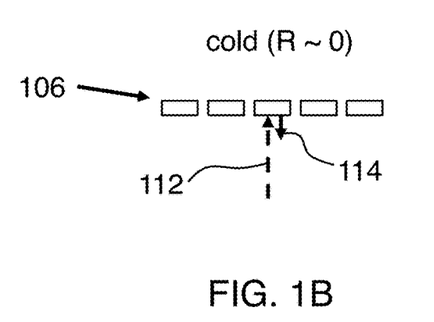
FIGS. 1B-C schematically show the operating principle of FPA pixels according to embodiments of the invention.
Figure 1C:
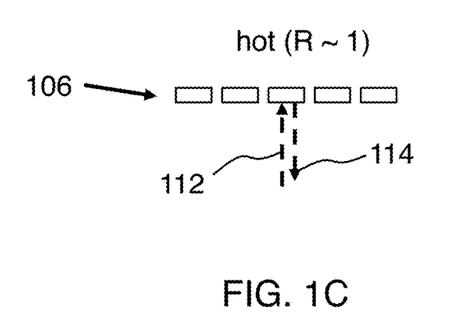

As illustrated in FIGS. 1B-C, the detector pixel is designed such that large temperature changes relative to the supporting substrate corresponding to hot objects in the far field lead to high reflectivity (R≈1) while small temperature changes corresponding to cold objects in the far field lead to low reflectivity (R≈0).

Figure 1D:
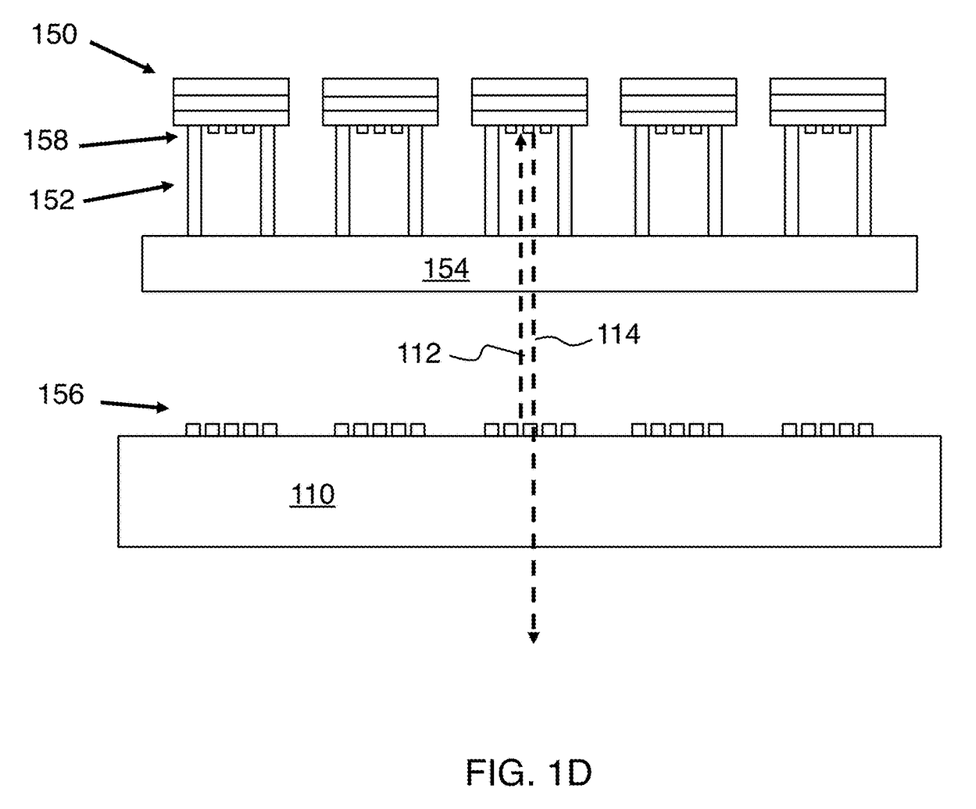
FIG. 1D shows an exemplary FPA array along with associated mechanical support and visible illumination structures.

FIG. 1D schematically shows an exemplary preferred embodiment of this approach. In this example, pixels 150 each include a resonant waveguide grating structure 158. Its underlying working principle is based on sensing small temperature changes of the detector pixel caused by thermo-optic effect. Diffractive optical waveguide 110 having diffractive features 156 is used to incouple visible light and illuminate the detector array as shown. Here 154 is the mechanical substrate for the FPA, and 152 are mechanical supports to hold the pixel elements above the substrate as required for the thermal design. The wave front of the reflected light as spatially modulated by the temperature map of the detector pixels carries the final IR image which can be directly viewed.

The light reflected from the pixel array is spatially modulated by the map of the temperature changes of the detectors. The diffractive optical waveguide 110 is usually designed with a small diffraction efficiency, such that the reflected light from the pixel array can transmit through the waveguide layer in the perpendicular direction. The resulting temperature map of ~mm² spot size can be directly viewed through the magnifying lens 116 as shown in FIG. 1A. While many parts of this optical architecture currently exist, the detector pixel for performing the intended functionality needs to be specially designed, and that is the focus of this work.

We note that optical measurement of thermal IR detector pixels has been explored previously. Some references also show the use of charge-coupled device (CCD) imagers to form an image based on light reflected from the detector pixels. In contrast to these works, here we envision that the temperature map on the detector pixel array is directly viewed by human eyes through a magnifying lens, in order to further simplify the design of thermal imaging systems. For this purpose, we design the pixels to achieve low to high reflectivity change at visible illumination wavelength indicating high contrast between cold and hot objects in the far field as illustrated in FIG. 1B. Our design utilizes resonant waveguide gratings which are different in terms of both geometry and material options from previous work in the context of optical measurement of IR detectors.

The commercial thermal IR cameras, which have matured after many decades of research, primarily use bolometers with electronic ROIC measurements. Although comparable or better performance may be achieved, introducing optical measurement instead of electronic readout in this well-established technology is challenging unless there is a significant (order of magnitude) or a distinct technological advantage of doing so. Our work advances this line of research by bringing to attention the unique advantage of optical readout in enabling direct thermal IR vision with a carefully engineered system such that additional components for A/D conversion, image processing, and a separate information display are no longer required. Since electronic readout is not sufficient for presenting the final IR image and these additional components are necessarily required for standard thermal IR cameras, the capability to realize direct thermal IR vision is in principle a distinct advantage of optical readout over electronic readout. Our work can potentially help to further advance the thermal IR imaging technology by reducing the form factor (size, weight), cost, and power consumption. It can pave the way for developing small-size, light-weight eye-wearables that can potentially augment human vision with thermal infrared vision.

II. Results

The functionality illustrated in FIGS. 1B-C requires each detector pixel to satisfy the following conditions. First, the pixel's reflectivity R at the visible illumination wavelength should change substantially with its temperature changes relative to the substrate. Moreover, it should change from low to high for increasing temperature differentials to indicate contrast between cold and hot objects in the far field. Second, the pixel should be a good absorber around the wavelength of 10 μm which corresponds to the peak wavelength of thermal radiation from near-room-temperature bodies. Third, the pixel should have good thermal isolation from its surroundings so that the absorbed thermal radiation can lead to a reasonable change in temperature, typically of the order of few Kelvins compared to the substrate. Fourth, the thermal time constant of the pixel should be small so that the response speed to the temporal variation of the incident thermal radiation is fast. Since the third requirement above limits the thermal conductance of the pixel to the surrounding environment, the thermal mass of the pixel should be sufficiently small. For standard thermal IR cameras, the third requirement is addressed by the suspension of microbolometer pixels on top of a substrate inside vacuum packaging such that the heat exchange occurs primarily via conduction between the detector and the substrate. Additionally, radiation shields are used to prevent any unwanted IR radiation from the packaging which is unrelated to the far-field scene. In the following, assuming the use of vacuum packaging and radiation shields, we describe our nanophotonic design that addresses the four pixel requirements. We also analyze the effects of any spurious temperature drifts and potential fabrication nonuniformity within or across detector pixels on the device performance, and clarify the related requirements and calibration methods to tackle them.

Figure 2A:
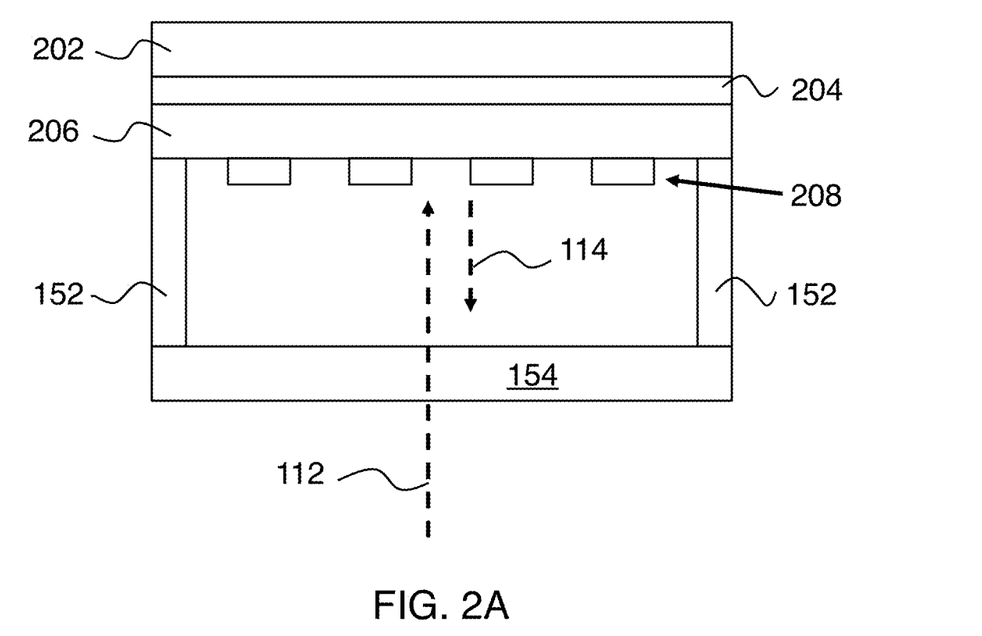
FIG. 2A shows an exemplary detailed pixel design.

FIG. 2A shows an exemplary design of a suspended photonic detector pixel whose reflectivity is highly sensitive to its temperature change. The specific design for the following description is as follows: layer 202 is $Si_3N_4$ having a thickness of 263 nm; layer 204 is $SiO_2$ having a thickness of 130 nm; layer 206 is SiC having a thickness of 264 nm; features 208 are SiC and have a feature height of 53 nm; and mechanical supports 152 are $SiO_2$ having a height of 1000 nm. Laterally, features 208 are arranged as a regular 2D array of disks (in a square lattice) having a disk diameter of 160 nm and unit cell dimensions of 320 nm by 320 nm. Substrate 154 can be any material that is transparent to the wavelength(s) of visible light being used.

This constitutes a detector pixel which is suspended on top of four insulating posts on a substrate. For calculations below, we assume substrate to be silica glass. We assume that each pixel is 12 μm×12 μm in lateral directions and separated by 1 μm from the neighboring pixel. Such pixel dimensions are common in photon IR and thermal IR detectors with the latest research reporting pixel sizes down to 5 μm. Since refractive indices of SiC and $Si_3N_4$ are larger than that of $SiO_2$ at visible wavelengths, these layers support guided modes which can couple to normally incident light via periodic grating, resulting into sharp resonant features in reflection and transmission spectra. Because the materials are low-loss and transparent in this wavelength range, it is possible to realize high quality factor ($Q > 10^4$) resonances. Such guided mode resonance structures also identified as resonant waveguide gratings (RWG) and analogous high contrast gratings with slight geometric modifications have been well-studied and also used for sensing small changes in refractive index. However, their use for the optical readout of IR detectors was not previously considered.

Figure 2B:
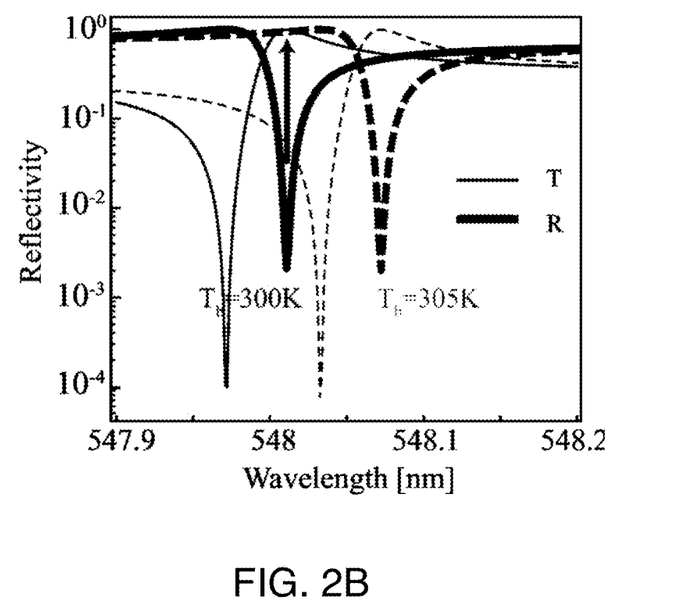
FIG. 2B shows an example of sensitive R (and T) as a function of temperature.

FIG. 2B demonstrates the reflection (solid lines) and transmission (dashed lines) spectra for normal incidence of light around=550 nm and for two different detector temperatures $T_b$=300 K and $T_b$=305 K. The arrow indicates the illumination wavelength where large reflectivity change can be obtained. The small temperature change induced by the absorbed thermal IR signals from the far-field causes a small change in the refractive index via the thermo-optic effect. The thermo-optic coefficient of SiC given by $$\frac{\partial n_{SiC}}{\partial T} = 5.8 \times 10^{-5}/K$$

is much larger than the coefficients of SiO$_2$ and Si$_3$N$_4$ (of the order of 10$^{-6}$/K). As shown in FIG. 2B, the high Q-factor resonant dip in the reflection spectrum shifts noticeably toward larger wavelength upon increasing the pixel temperature. When this structure is illuminated by a laser source close to λ=548 nm (green light), a large change in the reflectivity is observed as indicated by the arrow. R≈10$^{-3}$ at T$_b$=300 K changes to R≈1 at T$_b$=305 K.

Figure 2C:
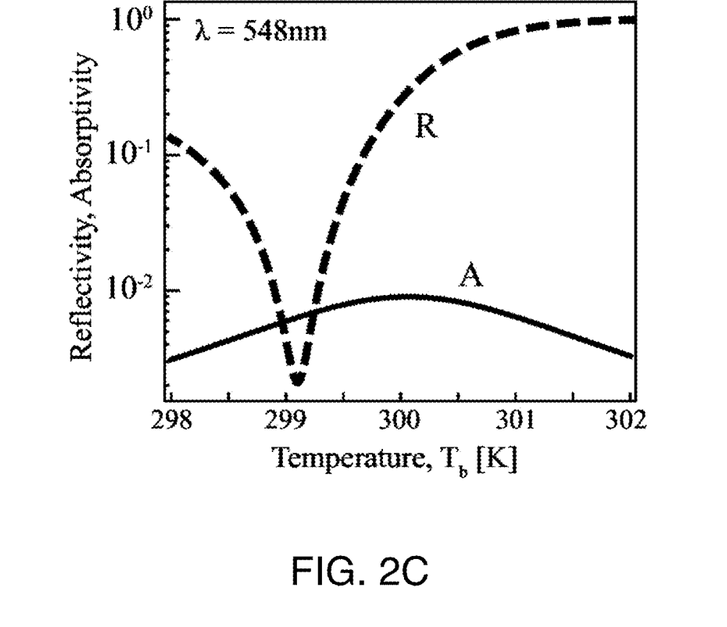
FIG. 2C is an exemplary plot of R and A vs. pixel temperature.

The temperature dependence of the reflectivity R is demonstrated in FIG. 2C assuming normal incidence of monochromatic laser light at 548 nm. The plot indicates that the reflectivity R increases monotonically as the temperature T$_b$ increases from 299.1 K up to 302 K. Thus, if the substrate temperature is fixed at T$_s$=299.1 K, this specific example system with illumination at 548 nm can be used to sense the differentials of (T$_b$−T$_s$) induced by IR absorption. Although we fixed T$_s$ and the illumination wavelength for explaining this underlying mechanism, we explain further below that the illumination wavelength can be readily tuned in real time by sensing the substrate temperature such that R≈0 in the absence of any incident thermal IR signals. We also note that the laser illumination can cause the detector pixel to heat up depending on illumination intensity, pixel area and pixel absorptivity. This structure exhibits low absorptivity (A≈10$^{-2}$) as shown by the labeled curve in FIG. 2C. For our specific design, we show below that the heating induced by the laser for typical illumination intensity appropriate for human vision is much smaller than the typical absorbed thermal IR power because of this low absorptivity.

Figure 2D:
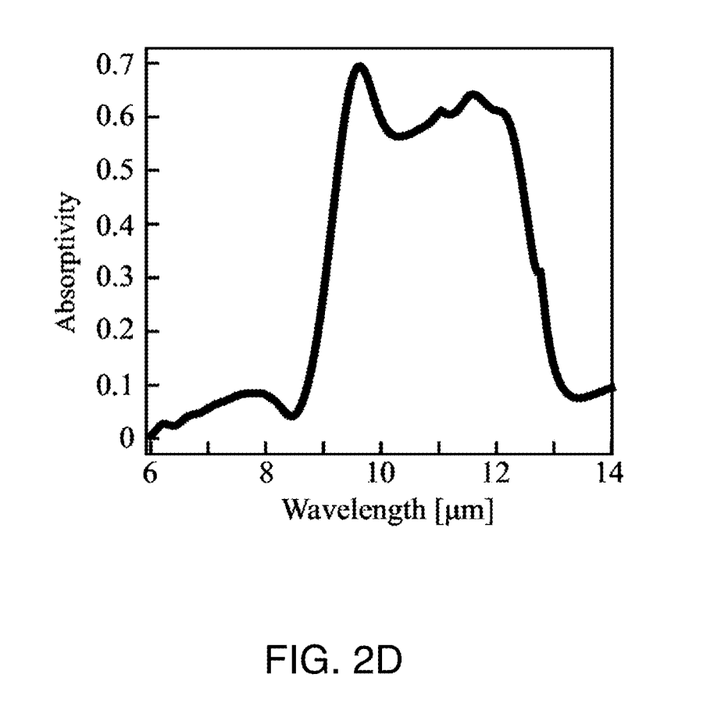
FIG. 2D shows IR absorptivity of the pixel of FIG. 2A.

We now discuss the details of our design related to the problem of IR detection. The thicknesses and lattice periods in this design are obtained using optimization informed by the physics of RWG structures as described in the methods section. The example system discussed above is by no means unique, and many solutions at various visible wavelengths can be readily obtained for different geometric parameters (thicknesses and lattice periods) using the same material layers. We also note that this optimization is performed with respect to the optical readout and not with respect to thermal IR absorption. Nonetheless, the above-described pixel structure is already a reasonably good absorber of thermal radiation as shown in FIG. 2D which is ensured by the specific choice of materials. In particular, the material choice in our design is governed by the fulfillment of two conditions, namely good infrared photon absorption in 8-14 μm range for LWIR detection and low-loss transparent nature at visible wavelengths (~300 nm-700 nm) for realizing high Q-resonance to detect small changes in pixel temperature. In microbolometers used in standard thermal IR detectors, Si$_3$N$_4$ is already used because of its broadband LWIR absorption. While SiC and SiO$_2$ also lead to resonant absorption in 8-12 μm due to their optical phonon polaritons, the resulting absorption spectrum is rather narrowband. Therefore, addition of Si$_3$N$_4$ layer in the present design helps enhance and broaden the LWIR absorption. In standard microbolometers, phase-transition materials such as vanadium oxide (VO$_x$) and amorphous silicon (aSi) which exhibit large thermal coefficient of resistance (TCR) of few %/K are typically used. While the same materials also exhibit large thermo-optic effect, they are quite lossy at visible wavelengths. Therefore, these materials as well as metals and metal oxides cannot be used for the intended detector pixel design.

Below, we quantitatively describe the thermal aspects of our nanophotonic design. The temperature of the detector pixel follows the heat equation:

$$m_t \frac{dT_b}{dt} = -G(T_b - T_s) + AI_b A_p + P_t \qquad (1)$$

where m$_t$ is the thermal mass given by the product of the mass and the specific heat capacity of each material layer, G is the thermal conductance between the pixel and the substrate via the insulating posts, I$_b$ is the intensity of the visible laser illumination, A<10$^{-2}$ is the visible absorptivity plotted in FIG. 2C, A$_p$ is the pixel area, and P$_t$ is the absorbed IR power. Using mass densities ρ$_{SiC}$=3210 kg/m$^3$, ρ$_{SiO2}$=2650 kg/m$^3$, ρ$_{Si3N4}$=3170 kg/m$^3$ and specific heat capacities c$_p^{SiC}$=670 J/kg·K, c$_p^{SiO2}$=2650 J/kg·K, c$_p^{Si3N4}$=673 J/kg·K, and taking into account volume fractions, we obtain m$_t$=2.22×10$^{-10}$ J/K. Assuming four insulating posts of length 1 μm and cross section 0.1 μm×0.1 μm, each made of SiO$_2$ of thermal conductivity κ=1.4 W/m·K, thermal conductance G=5.6×10$^{-8}$ W/K is calculated based on Fourier's law of conduction. While we considered insulating posts for simplicity of this calculation, the bridge structure typically used in standard thermal IR detectors can also be employed without any changes to the detector pixel design. In fact, advances in microelectromechanical systems (MEMS) technology have now enabled G<10$^{-8}$ W/K using such bridge structures for thermal IR detectors. The response speed is characterized by the time constant τ=m$_t$/G which is 4 ms for our design. For typical microbolometers, the absorbed thermal power depends on the pixel area A$_p$, pixel absorptivity plotted in FIG. 2D, the transmissivity of the lens used for focusing the IR light, temperature and distance of the object emitting the IR light etcetera. Instead of introducing many new parameters here, we refer to the previous work and use the typical values of P$_t$ for typical microbolometers of similar pixel areas which are in the range of tens of nW.

Figure 3A:
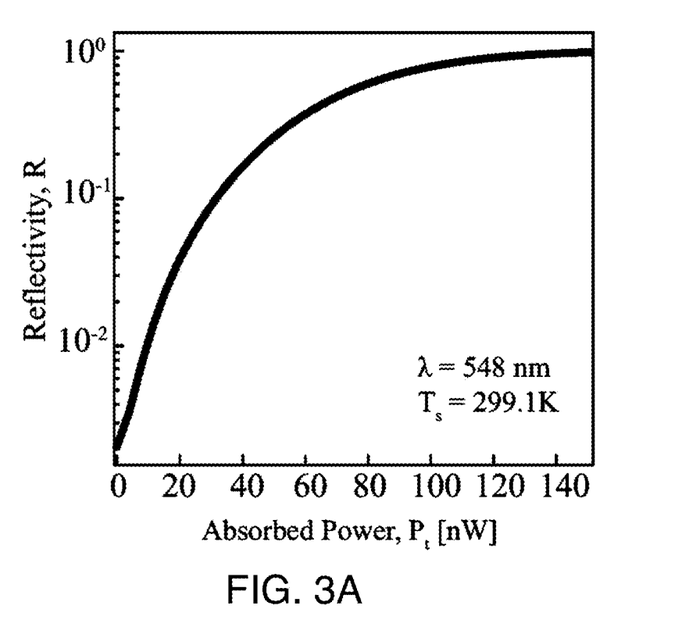
FIG. 3A shows an exemplary plot of R vs. absorbed IR power.
Figure 3B:
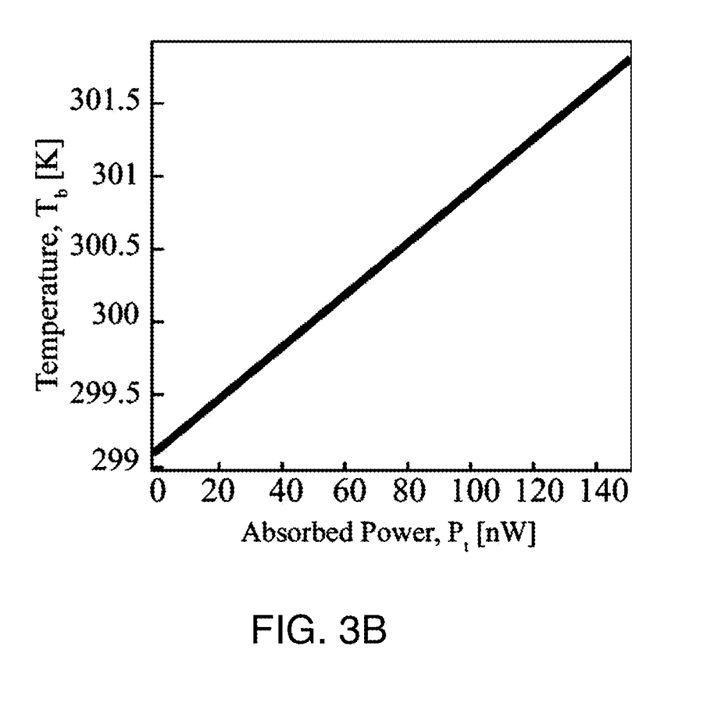
FIG. 3B shows an exemplary plot of pixel temperature vs. absorbed IR power.

FIG. 3A depicts the change in the reflectivity for the specific example system analyzed above as a function of absorbed thermal IR power. We assume that the intensity of incident visible light coming from the diffractive optical waveguide is around 2 W/m$^2$ (approximately 800 Cd/m$^2$ similar to the brightness levels of displays like computer monitors). Because of small absorptivity A~0.01 of the pixels of area A$_p$=144 μm$^2$, the absorbed optical power is 3 pW which is much smaller than the typical values of absorbed thermal IR power. The heating due to thermal IR absorption leads to small changes in the detector temperature (T$_b$) which is demonstrated in FIG. 3B. These changes are obtained by solving Eq. 1. Accordingly, the reflectivity is changed leading to strong reflection corresponding to LWIR radiation coming from hot objects in the far field. We note that the reflectivity changes over wider temperature ranges of T$_b$ can also be engineered with different optimized nanophotonic design. The possible temperature swing of the detector pixel primarily depends on the thermal conductance G and the maximum absorbed thermal IR power by the relation T$_b$=max {P$_t$}/G. These parameters can be estimated in separate experiments and the design can be iterated to realize optimized performance.

Figure 4A:
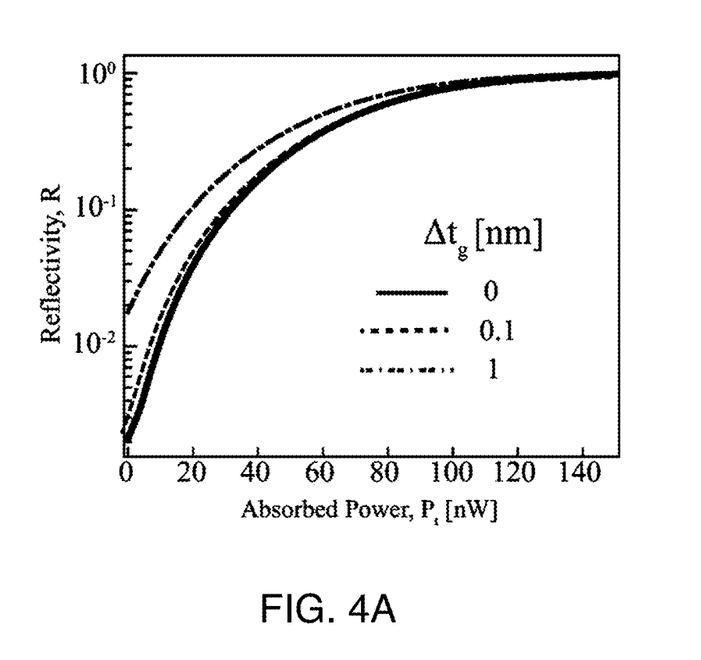
FIG. 4A shows an example of the effect of resonant waveguide grating thickness perturbations on R.
Figure 4B:
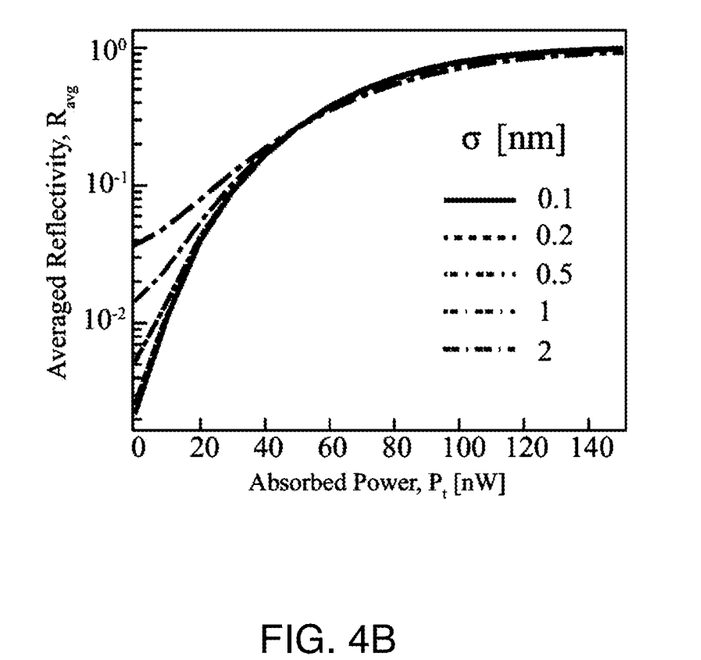
FIG. 4B shows an example of the effect of the standard deviation of resonant waveguide grating thickness perturbations on averaged R.

We note that the pixel uniformity across all pixels is important for recreating reliable final IR image of the far-field scene. Designs using high Q resonance for refractive index sensing also respond sensitively to design perturbations. For example, FIG. 4A demonstrates the reflectivity dependence on $P_t$ by introducing small perturbation $\Delta t_g$ in the thickness of the grating. As evident from the figure, nanometric fabrication variations can cause reflectivity to deviate for small values of R. While lattice periods are usually accurate, the grating structures may experience small perturbations even for a single pixel. To address these perturbations, we assume a zero-mean Gaussian-distributed error of standard deviation σ in the grating thickness for all detector pixels and plot the averaged reflectivity in FIG. 4B. At small values of $P_t$, the averaged reflectivity at σ≈2 nm deviates from the averaged reflectivity for the design with small values of τ≈0.1 nm. Although such deviations need to be analyzed for accurate quantitative estimations of temperatures of far-field objects, from the perspective of direct thermal IR vision which is the focus of this work, high contrast and monotonic increase exhibited by the averaged reflectivity of the detector pixels having nanometric fabrication nonuniformity can be considered acceptable. For this exemplary design, the detector FPA of 1024×1024 pixels will require fabrication precision of at most few nm standard deviation of surface roughness over ~mm² area of the device. We note that advances in lithography techniques such as nanoimprint lithography have enabled low-cost fabrication of large-area patterned surfaces. Also, subnanometer precision in terms of surface roughness of approximately 0.15 nm has been realized for SiC on insulator surfaces. Therefore, we believe that fabrication requirements for designs described herein can be ensured using state-of-the-art lithography techniques.

Figure 4C:
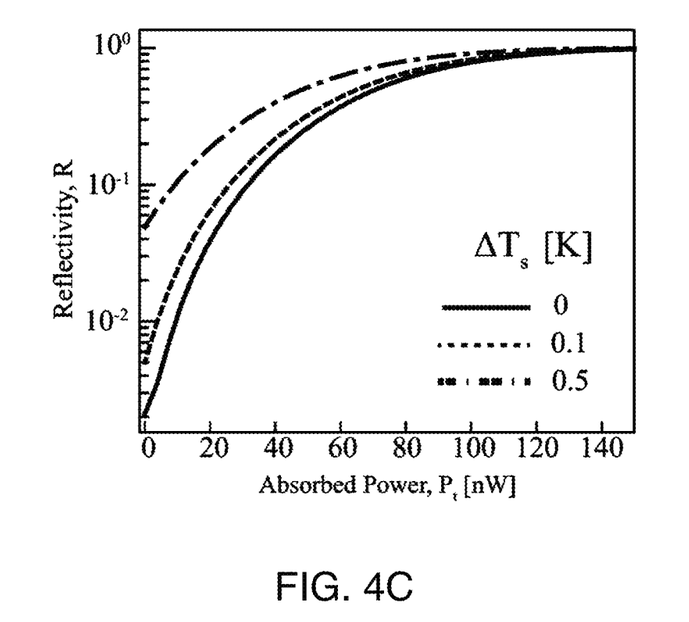
FIG. 4C shows an example of the effect of substrate temperature perturbations on R.

In the design of microbolometer IR detectors, significant importance is given to drifts or small changes in the substrate temperature ($T_s$). The detector is designed to be highly sensitive to $T_b$ which depends on the absorbed IR power and the substrate temperature $T_s$. Variation in $T_s$ causes an equal variation in $T_b$, and this becomes a major source of unwanted signal which is unrelated to IR signals coming from the far field. Various calibration or compensation approaches are used in standard microbolometer IR detectors to tackle this important issue. The same holds true for optical readout designs of this work. For instance, FIG. 4C demonstrates the reflectivity dependence on Pt for small variations in the substrate temperature ($\Delta T_s$) for fixed illumination wavelength. Evidently, the deviation in R is quite large for small $\Delta T_s$~0.5 K. This problem can be solved by tuning the illumination wavelength in real time based on prior measurements of reflectivity for different values of $T_s$.

Figure 4D:
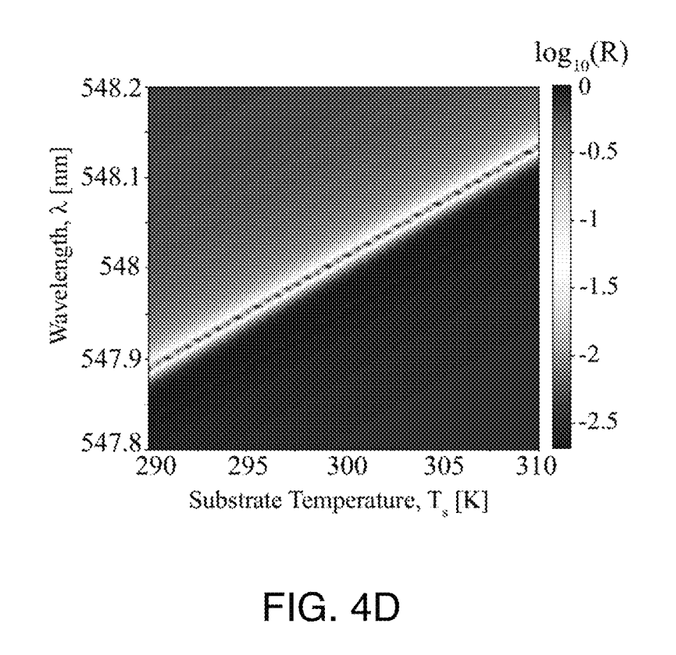
FIG. 4D is a 2D plot of R vs. wavelength and substrate temperature.

The contour plot in FIG. 4D illustrates that the illumination wavelength which should coincide with the resonant dip ($R<10^{-3}$) in the reflectivity spectrum increases linearly with $T_s$. Such linear tunability can be achieved with on-chip microheaters with integrated tunable visible laser sources. While our architecture does not involve electronic readout and digital processing, it will preferably include a thermocouple to measure $T_s$ and a controller system to tune the illumination wavelength in a predetermined manner in real time. An alternative to such a controller system can be temperature stabilization using small Peltier elements used in some versions of thermal IR cameras. On-chip device temperatures can be stabilized within few mK temperature variations and the operating wavelength can be fixed to coincide with the resonant dip in the reflectivity spectrum. We note that the fabrication nonuniformity and the temperature drifts can also be mitigated by using illumination light of bandwidth comparable or close to the bandwidth of the resonant dip in the reflection spectrum instead of using monochromatic light. Since the response is integrated (or averaged) over a bandwidth of wavelengths, the sensitivity to unwanted design perturbations is reduced. Aside from the specific detector pixel requirements and considerations related to fabrication and temperature drifts (discussed above), vacuum packaging and radiation shields are preferred for developing a proof-of-concept thermal IR imaging system. The same packaging solutions used for traditional microbolometer FPAs can be translated and used for our design.

III. Conclusion

We introduced a new nanophotonic detector in place of traditional microbolometer as a viable minimalist approach to thermal IR imaging. Our design produces an IR image as spatially modulated wave front of reflected visible light which can be directly viewed by the human eye. This design eliminates the need for additional components for electronic readout, A/D conversion, image processing and information display, otherwise necessary in standard thermal IR cameras. This design can be useful for achieving the same functionality as IR cameras potentially at reduced cost, form factor and power consumption. We note that digital processing of electronic or optical measurement of the detector pixels is useful for additional error-compensation techniques and is necessary for providing quantitative estimates (in numbers) of temperatures of far-field objects. A figure of merit called as noise equivalent temperature difference (NETD) is used to compare the performance of IR cameras in their ability to quantify tiny temperature differences between two far-field objects. Our design does not provide such quantitative temperature estimates since it is designed to directly provide an IR image to the human eye. Nonetheless, there can be use cases where this minimalist approach can be potentially employed. For many practical applications of IR cameras such as inspection and detection in industrial, infrastructure, agriculture, healthcare settings, night vision or low-light vision for military, fire-fighters, camping enthusiasts, the objective of the device is to provide an IR image to the human eye. In some of these use cases, the final human evaluation is often based on the IR image and not the temperature numbers, thus requiring strong contrast and good quality of the IR image. Therefore, we believe that the present minimalist approach can be practically useful.

Apart from the actual proof-of-concept experimental demonstration, there are many interesting aspects of this work that can be further extended in the near future. All components used in the design are transparent at visible wavelengths. If the optical lenses are optimized simultaneously for visible and infrared wavelengths to reduce chromatic aberration, it is conceivable that the final image will contain IR image at the specific laser illumination wavelength overlaid on top of the visible image. Such augmented thermal vision functionality with frugal resources can be an interesting new technology. One can also design multispectral IR imaging where different IR wavelengths are mapped to different visible wavelengths using multiple optimized pixels. For example, two types of detector pixels can be designed to potentially map SWIR (3-8 μm) light to green light and LWIR (8-14 μm) light to red light. Such a functionality is quite challenging to develop even with traditional microbolometer detectors. We believe that our work paves the way for developing such novel IR imaging capabilities in the near future.

IV. METHODS

The permittivities of SiC, $SiO_2$ and $Si_3N_4$ are obtained from the literature. The simulation of reflection and transmission is performed using well-known rigorous coupled wave analysis (RCWA) technique. Open-source RCWA code is available under GPL license. For the calculation of the detector pixel absorptivity of the incident IR radiation plotted in FIG. 2D, we calculate the flux reflected from the pixel and the flux in the vacuum gap between the pixel and the substrate, assuming normal incidence of light. For our nanophotonic design of the pixel as a refractive index sensor, we use the Nelder-Mead method to find the geometric parameters (thickness of each material layer) which minimize the ratio of the reflectivities given by $R(T_b=300\ K)/R(T_b=305\ K)$ at a fixed wavelength. Because of physics-informed ordering of layers (intended to support guided modes inside SiC and $Si_3N_4$ layers), this optimization upon few trials and starting points yields optimized design with $R(T=300\ K) \sim 10^{-3}$ and $R(T=305\ K) \sim 0.9$. Additional inverse design constrained and informed by nanofabrication capabilities and costs can certainly be formulated to automate this design with the objective of achieving the reflectivity change from $R \approx 0$ to $R \approx 1$ over a specific temperature differential. This differential is given by $T_b = \max\{Pt\}/G$ where the conductance G and the typical absorbed thermal IR power $P_t$ for the detector pixel can be estimated separately for the fabricated design.

The invention claimed is:

1. Apparatus comprising:
   a focal plane array including two or more pixels;
   an input imager configured to receive infrared light from a scene being viewed and configured to provide an infrared image of the scene being viewed to the focal plane array;
   wherein temperatures of the pixels of the focal plane array form a temperature image corresponding to the infrared image;
   wherein the pixels of the focal plane array have a visible reflectance that depends on pixel temperature;
   a source of visible light configured to illuminate the focal plane array with visible light; and
   an output imager configured to receive the visible light from the focal plane array and configured to provide a visible image to a user;
   wherein the output imager is configured for direct viewing by the user, whereby no electronic processing of the infrared image is needed to make the infrared image visible;
   wherein the visible reflectance increases monotonically as the pixel temperature increases.

2. The apparatus of claim 1, further comprising a diffractive optical waveguide configured to be side-illuminated by the source of visible light, wherein diffraction in the diffractive optical waveguide directs the visible light from the source of visible light to the focal plane array, and wherein visible light from the focal plane array passes through the diffractive optical waveguide to reach the output imager.

3. The apparatus of claim 1, wherein the pixels of the focal plane array include one or more temperature sensitive optical structures selected from the group consisting of: resonant waveguide gratings, photonic crystal resonators, whispering gallery resonators, and meta-atoms having Mie resonances.

4. The apparatus of claim 1, wherein the visible light is at one or more wavelengths between 380 nm and 750 nm.

5. The apparatus of claim 1, wherein the infrared light is at one or more wavelengths between 8 μm and 14 μm.

6. The apparatus of claim 1, wherein the source of visible light is a laser.

7. The apparatus of claim 1, wherein the pixels of the focal plane array are substantially thermally isolated from each other and from any other on-device heat sources.

8. The apparatus of claim 1, wherein the pixels of the focal plane array include a material having a transmittance of 90% or more through a thickness of 10 mm in a wavelength range from 380 nm to 700 nm.

9. The apparatus of claim 1, wherein the pixels of the focal plane array have an absorptivity of 0.5 or more at one or more wavelengths in the infrared wavelength range of interest.

10. The apparatus of claim 1, wherein the pixels of the focal plane array include a material having a thermo-optic coefficient of $10^{-6}\ K^{-1}$ or more.

11. The apparatus of claim 1, wherein the pixels of the focal plane array each include an SiC absorber layer for the infrared light.

12. The apparatus of claim 11, wherein the pixels of the focal plane array each include an $Si_3N_4$ absorber layer for the infrared light.

13. The apparatus of claim 3, wherein the temperature sensitive optical structures are formed in materials that are transparent to visible light.

* * * * *